United States Patent
Inoue et al.

(10) Patent No.: US 11,123,861 B2
(45) Date of Patent: Sep. 21, 2021

(54) ROBOT SYSTEM

(71) Applicant: FANUC CORPORATION, Yamanashi (JP)

(72) Inventors: Toshihiko Inoue, Yamanashi (JP); Toshikatsu Kuroki, Yamanashi (JP); Naoki Fujioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 228 days.

(21) Appl. No.: 16/662,801

(22) Filed: Oct. 24, 2019

(65) Prior Publication Data

US 2020/0130180 A1    Apr. 30, 2020

(30) Foreign Application Priority Data

Oct. 24, 2018 (JP) .............................. JP2018-199858
Oct. 21, 2019 (JP) .............................. JP2019-192078

(51) Int. Cl.
*B25J 9/16* (2006.01)
*B25J 19/00* (2006.01)
*B25J 13/00* (2006.01)

(52) U.S. Cl.
CPC ............. *B25J 9/1612* (2013.01); *B25J 9/161* (2013.01); *B25J 9/1664* (2013.01)

(58) Field of Classification Search
CPC ........ B25J 9/1612; B25J 9/161; B25J 9/1664; B25J 9/1674; B25J 19/0025; B25J 13/00
USPC .................................................. 700/245–264
See application file for complete search history.

(56) References Cited

U.S. PATENT DOCUMENTS

| | | | |
|---|---|---|---|
| 4,703,668 A | * | 11/1987 | Peter .................... B25J 19/0029 74/490.06 |
| 4,705,243 A | * | 11/1987 | Hartmann ............ B23K 11/362 248/160 |
| 4,767,257 A | * | 8/1988 | Kato .................... B25J 19/0025 414/744.5 |
| 5,093,552 A | | 3/1992 | Torii et al. |
| 5,437,207 A | * | 8/1995 | Zimmer ............... B23K 11/318 414/918 |

(Continued)

FOREIGN PATENT DOCUMENTS

| | | |
|---|---|---|
| EP | 1352721 A1 | 10/2003 |
| EP | 1602460 A1 | 12/2005 |

(Continued)

*Primary Examiner* — Jaime Figueroa
(74) *Attorney, Agent, or Firm* — Maier & Maier, PLLC (57) ABSTRACT

A robot system including a robot body and a control device. The robot body includes wrist elements at a distal end of an arm; a wired wire body connected to an end effector fixed to the third wrist element. The control-device includes an angle calculation unit that calculates, in a Cartesian coordinate system of which the origin is the wire-body outlet and which has one coordinate axis extending in a direction along the first axis, angles of straight lines connecting the wire-body outlet and specific points of the wire body, with the straight lines projected onto a plane perpendicular to the coordinate axis, about the coordinate axis, with reference to a position where a load acting on the wire body is the least; and a determination unit that determines whether the absolute values of the angles calculated by the angle calculation unit have exceeded predetermined angle thresholds.

7 Claims, 5 Drawing Sheets

(56) References Cited

U.S. PATENT DOCUMENTS

| | | | | |
|---|---|---|---|---|
| 5,732,599 | A * | 3/1998 | Iriyama | B25J 17/0241 74/490.02 |
| 6,014,909 | A * | 1/2000 | Fiora | B25J 15/04 74/490.02 |
| 9,073,204 | B2 * | 7/2015 | Isobe | B25J 9/0048 |
| 9,216,479 | B2 * | 12/2015 | Takahashi | B25J 19/0025 |
| 9,289,898 | B2 * | 3/2016 | Ono | B25J 19/0041 |
| 9,302,397 | B2 * | 4/2016 | Kimoto | G05B 23/0289 |
| 9,586,326 | B2 * | 3/2017 | Hasuo | B25J 19/0025 |
| 9,806,457 | B2 * | 10/2017 | Watanabe | H01R 13/60 |
| 10,160,120 | B2 * | 12/2018 | Hirano | B25J 19/0025 |
| 10,456,908 | B2 * | 10/2019 | Bordegnoni | B25J 9/0009 |
| 10,654,170 | B2 * | 5/2020 | Hara | B25J 19/025 |
| 2003/0192390 | A1 | 10/2003 | Uematsu et al. | |
| 2004/0261563 | A1 * | 12/2004 | Inoue | B25J 19/0025 74/490.03 |
| 2006/0037950 | A1 | 2/2006 | Nihei et al. | |
| 2006/0104791 | A1 | 5/2006 | Nihei et al. | |
| 2008/0056859 | A1 * | 3/2008 | Inoue | B25J 19/0029 414/222.01 |
| 2008/0315820 | A1 * | 12/2008 | Inoue | B25J 19/0029 318/568.11 |
| 2013/0154676 | A1 * | 6/2013 | Wu | G01N 3/08 324/750.01 |
| 2014/0358279 | A1 * | 12/2014 | Kimoto | B25J 19/0025 700/245 |
| 2015/0040713 | A1 | 2/2015 | Hirano | |
| 2015/0068347 | A1 | 3/2015 | Kirihara | |
| 2015/0068348 | A1 | 3/2015 | Kirihara | |
| 2015/0068349 | A1 | 3/2015 | Hirabayashi | |
| 2015/0068350 | A1 | 3/2015 | Kirihara | |
| 2015/0246449 | A1 * | 9/2015 | Sakai | B25J 19/0025 74/490.02 |
| 2016/0297081 | A1 * | 10/2016 | Watanabe | B25J 19/0025 |
| 2018/0333596 | A1 * | 11/2018 | Kils | A62B 1/14 |
| 2019/0077012 | A1 | 3/2019 | Inoue et al. | |
| 2019/0129381 | A1 * | 5/2019 | Tanno | B25J 19/0025 |
| 2020/0009747 | A1 * | 1/2020 | Inoue | B25J 19/0025 |
| 2020/0104437 | A1 * | 4/2020 | Yu | G06F 30/25 |

FOREIGN PATENT DOCUMENTS

| | | |
|---|---|---|
| EP | 1629950 A1 | 3/2006 |
| EP | 2835226 A1 | 2/2015 |
| JP | H0319789 A | 1/1991 |
| JP | H0631474 A | 2/1994 |
| JP | 2003305683 A | 10/2003 |
| JP | 2005342859 A | 12/2005 |
| JP | 3746244 B2 | 2/2006 |
| JP | 2006055954 A | 3/2006 |
| JP | 2015054387 A | 3/2015 |
| JP | 6122731 B2 | 4/2017 |
| JP | 2019048340 A | 3/2019 |

* cited by examiner

ROBOT SYSTEM

CROSS-REFERENCE TO RELATED APPLICATIONS

This application is based on Japanese Patent Application No. 2018-199858 and No. 2019-192078, the contents of which are incorporated herein by reference.

FIELD

The present invention relates to a robot system.

BACKGROUND

In the related art, there is a known industrial robot in which part of a wire body wired through the inside of the robot is taken out to the outside of a wrist and is connected to a tool mounted at the distal end of the wrist, thereby giving a sufficient extra length of the wire body in an external space of the wrist, and the sufficient extra length of the wire body absorbs bending and twisting of the wire body caused by the operation of the wrist, thus reducing damage to the wire body (for example, Japanese Unexamined Patent Application, Publication No. 2003-305683).

SUMMARY

According to one aspect, the present invention provides a robot system including: a robot body; and a control device that controls the robot body, wherein the robot body is provided with a first wrist element that is supported at a distal end of an arm so as to be rotatable about a first axis extending along the longitudinal axis of the arm, a second wrist element that is supported on the first wrist element so as to be rotatable about a second axis intersecting the first axis, and a third wrist element that is supported on the second wrist element so as to be rotatable about a third axis intersecting the second axis; a wire body that is wired through the inside of the arm is connected to an end effector fixed to the third wrist element, by passing through an aerial path outside the robot body, from a wire-body outlet provided in the first wrist element; and the control device is provided with: an angle calculation unit that calculates, in a Cartesian coordinate system of which the origin is the wire-body outlet and which has one coordinate axis extending in a direction along the first axis, an angle of a straight line that connects the wire-body outlet and a specific point of the wire body, with the straight line projected onto a plane perpendicular to the coordinate axis, about the coordinate axis, with reference to a position where a load acting on the wire body is the least; and a determination unit that determines whether the absolute value of the angle calculated by the angle calculation unit has exceeded a predetermined angle threshold.

DETAILED DESCRIPTION

A robot system 1 according to one embodiment of the present invention will be described below with reference to the drawings.

Figure 1:
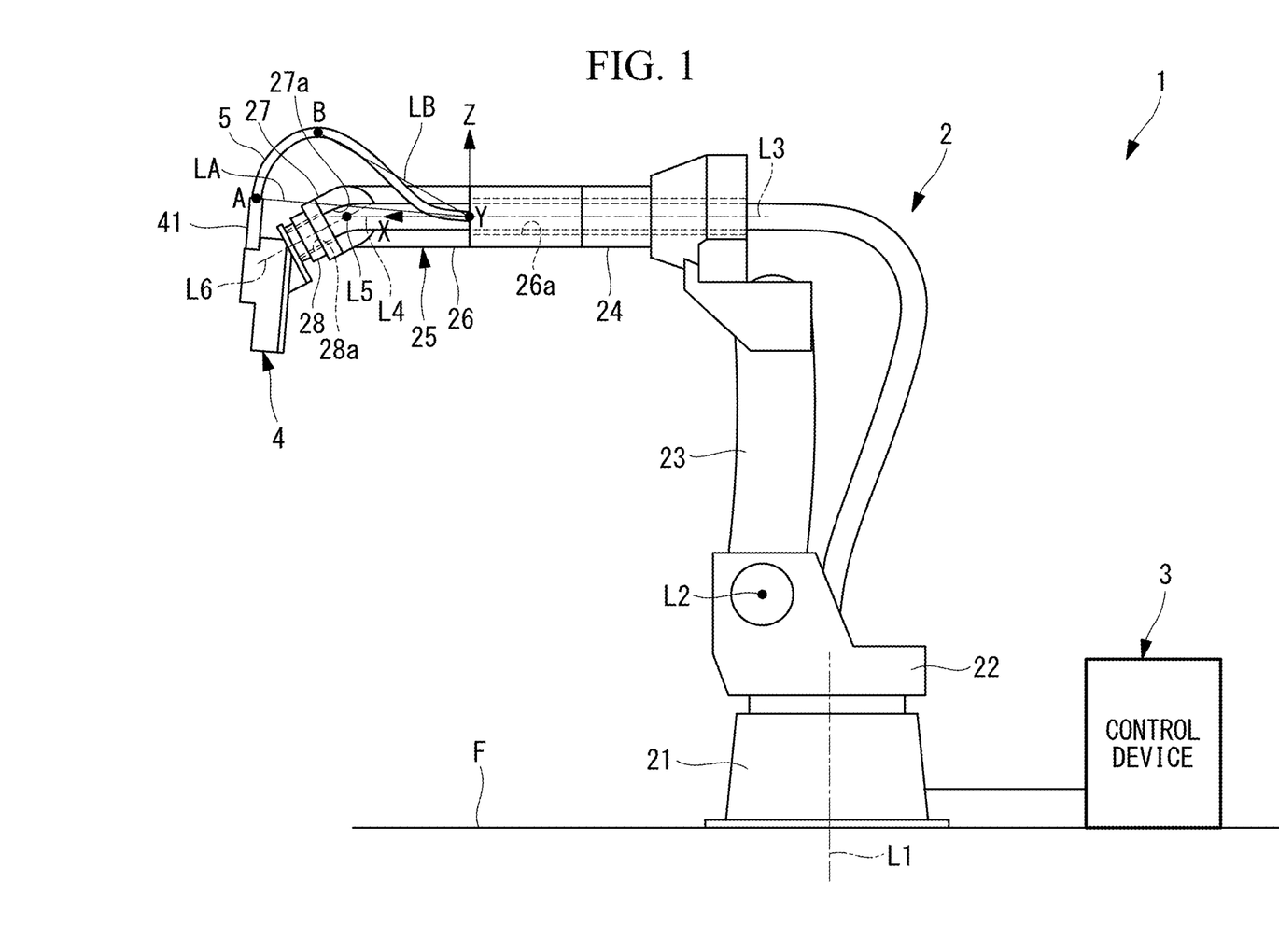
FIG. 1 is a view showing the overall configuration of a robot system according to one embodiment of the present invention.

As shown in FIG. 1, the robot system 1 of this embodiment is provided with a robot body 2 and a control device 3 that controls the robot body 2.

The robot body 2 is, for example, a 6-axis articulated-type robot and is provided with: a base 21 that is installed on a floor surface F; a turning torso 22 that is supported so as to be rotatable about a vertical first axis L1 with respect to the base 21; a first arm 23 that is supported so as to be rotatable about a horizontal second axis L2 with respect to the turning torso 22; a second arm (arm) 24 that is supported so as to be rotatable about a horizontal third axis L3 with respect to the first arm 23; and a 3-axis wrist unit 25 that is mounted at a distal end of the second arm 24.

The 3-axis wrist unit 25 is provided with: a first wrist element 26 supported so as to be rotatable, about a fourth axis (first axis) L4 that extends in a direction along the longitudinal axis of the second arm 24, with respect to the second arm 24; a second wrist element 27 supported so as to be rotatable, about a fifth axis (second axis) L5 that is perpendicular to the fourth axis L4, with respect to the first wrist element 26; and a third wrist element 28 supported so as to be rotatable, about a sixth axis (third axis) L6 that is perpendicular to the fifth axis L5 and that passes through the intersection point of the fourth axis L4 and the fifth axis L5, with respect to the second wrist element 27.

The second arm 24 and the first wrist element 26 have hollow structures that have a hollow hole 26a around the fourth axis L4 and extending along the fourth axis L4. The second wrist element 27 and the third wrist element 28 have also hollow structures that have hollow holes 27a and 28a, respectively, around the sixth axis L6 and extending along the sixth axis L6.

A laser processing tool (end effector) 4, for example, is fixed to the third wrist element 28. A high-rigidity cable (not shown) or the like for driving the laser processing tool 4 passes through the hollow hole 26a in the second arm 24 and the first wrist element 26 from the rear side of the second arm 24, passes through the hollow holes 27a and 28a in the second wrist element 27 and the third wrist element 28 via an aerial path from the outlet (wire-body outlet) of the hollow hole 26a in the first wrist element 26, and is connected to the laser processing tool 4. By wiring the high-rigidity cable along the fourth axis L4 and the sixth axis L6, excessive twisting and bending caused by rotation of the first wrist element 26, the second wrist element 27, and the third wrist element 28 are prevented from being applied to the cable.

On the other hand, a low-rigidity optical fiber cable (wire body) 5 that is guided inside the hollow hole 26a in the first wrist element 26 to the outlet of the hollow hole 26a, together with the cable or the like, is connected to the laser processing tool 4 via an aerial path different from that for the high-rigidity cable. Because the optical fiber cable 5 is not wired along the fourth axis L4 and the sixth axis L6, the optical fiber cable 5 is wired in a state in which a sufficient extra length for absorbing twisting and bending caused by rotation of the first wrist element 26, the second wrist element 27, and the third wrist element 28 is given.

However, depending on the orientations of the wrist elements 26, 27, and 28, in some cases, excessive bending, pulling, or compression acts at a specific point A that is located at a connection part 41 of the optical fiber cable 5 for connecting to the laser processing tool 4 or at a specific point B that is located at an intermediate position of the optical fiber cable 5 in the longitudinal direction. The specific points A and B can be arbitrarily set.

The control device 3 is provided with a processor and a memory and, as shown in FIG. 1, defines an outlet coordinate system that is a Cartesian coordinate system having the origin O at the center of the outlet of the hollow hole 26a in the first wrist element 26 and having an X-axis (coordinate axis) extending in the direction along the fourth axis L4.

Then, the control device 3 calculates the coordinates of each of the specific points A and B on the basis of angle information on the respective wrist elements 26, 27, and 28 of the robot body 2. The coordinates of the connection part 41 on the laser processing tool 4 can be uniquely calculated on the basis of the angle information on the respective wrist elements 26, 27, and 28 and the dimensions of the laser processing tool 4, and the coordinates of the intermediate position of the optical fiber cable 5 can be estimated on the basis of the angle information on the respective wrist elements 26, 27, and 28.

Figure 2:
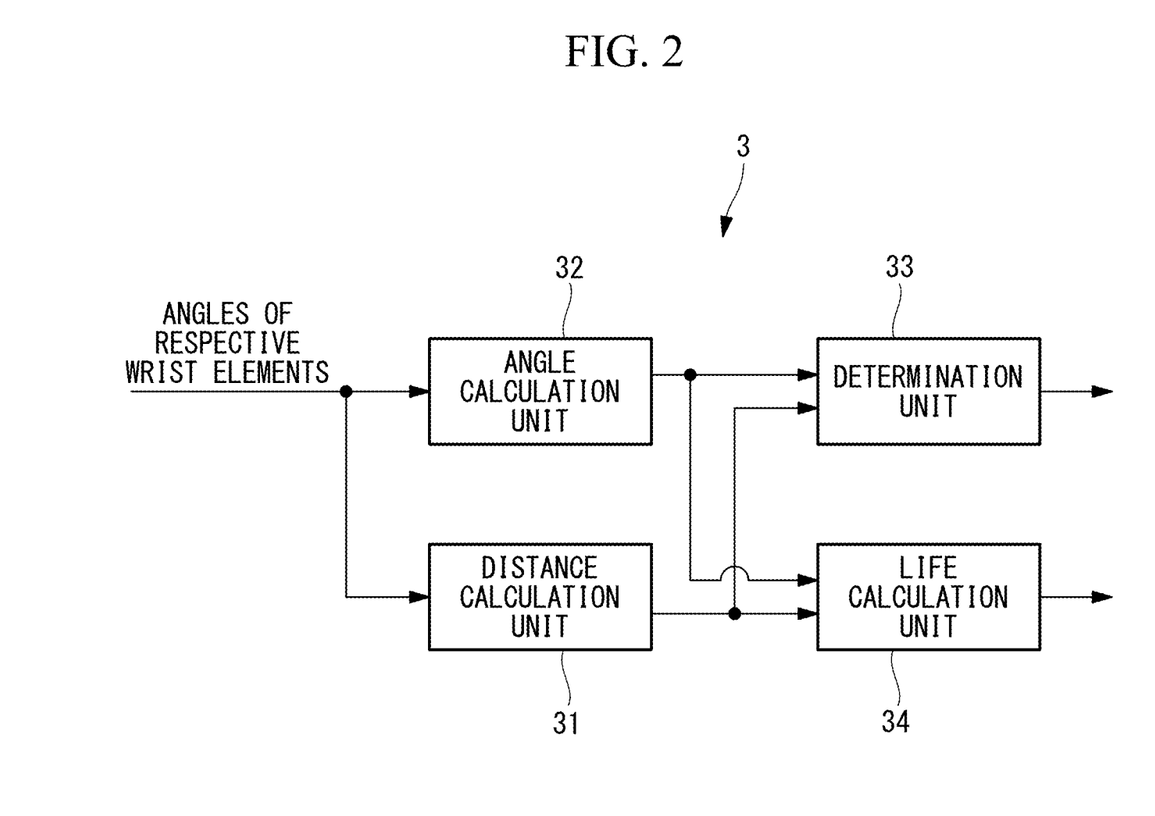
FIG. 2 is a block diagram for explaining a control device of the robot system shown in FIG. 1.

As shown in FIG. 2, the control device 3 is provided with: a distance calculation unit 31 that assumes there are straight lines LA and LB connecting the calculated coordinates of the specific points A and B and the origin O and that calculates the lengths (distances) $A_R$ and $B_R$ of the straight lines LA and LB; and an angle calculation unit 32 that calculates angles $A_\theta$ and $B_\theta$ of the straight lines LA and LB with respect to the Z-axis when the straight lines LA and LB are projected onto a YZ-plane. In this embodiment, when the angles $A_\theta$ and $B_\theta$ with respect to the Z-axis are 0°, the load on the optical fiber cable 5 is the least.

Figure 3:
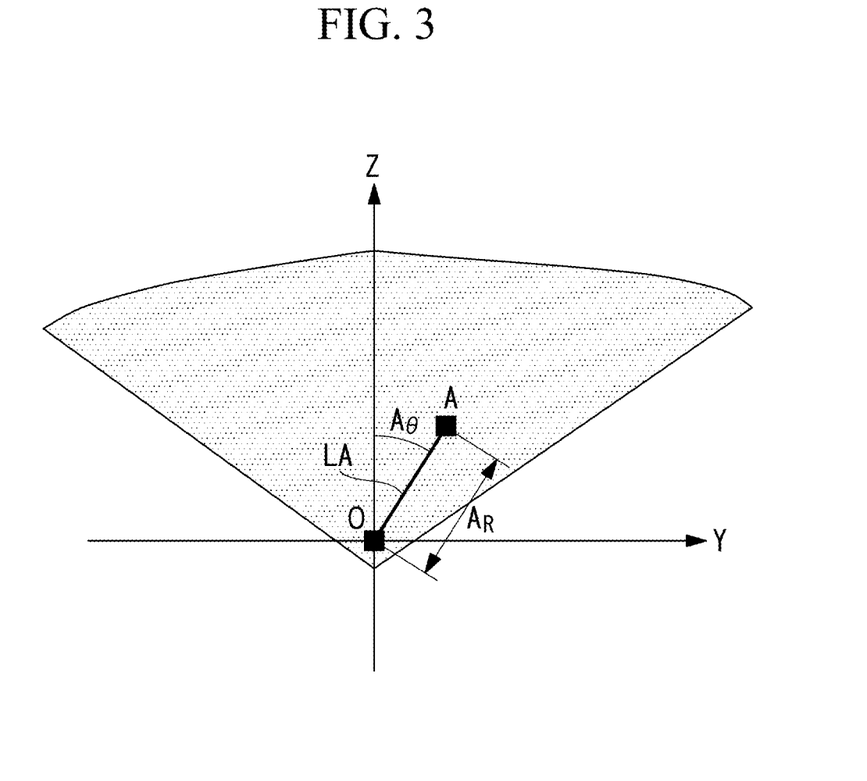
FIG. 3 is a view for explaining determination of the amount of damage at a specific point A, made by a determination unit of the control device shown in FIG. 2.
Figure 4:
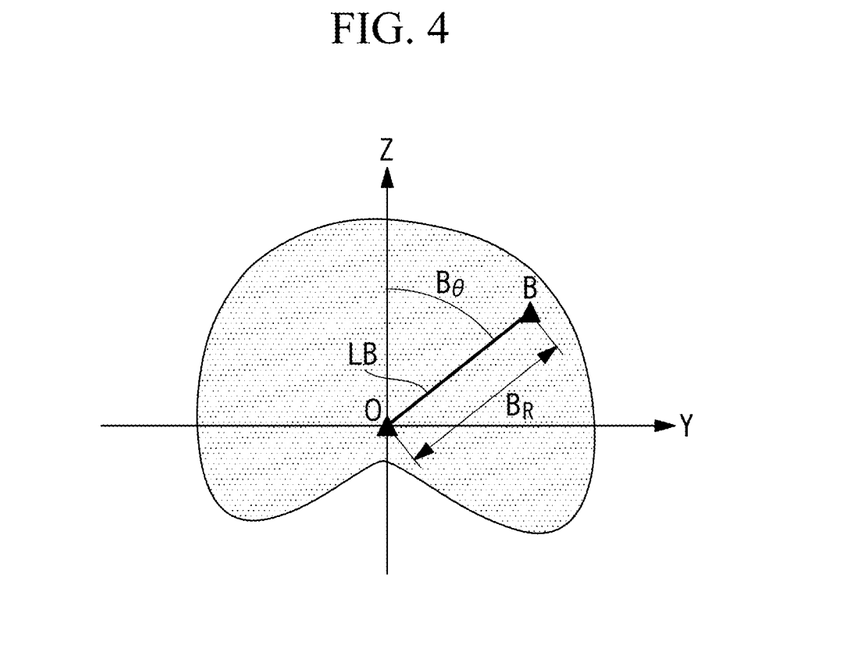
FIG. 4 is a view for explaining determination of the amount of damage at a specific point B, made by the determination unit of the control device shown in FIG. 2.

The control device 3 is provided with: a determination unit 33 that stores angle thresholds associated with the angles $A_\theta$ and $B_\theta$ and distance thresholds associated with the lengths $A_R$ and $B_R$ and that determines whether the calculated angles $A_\theta$ and $B_\theta$ and the calculated lengths $A_R$ and $B_R$ have exceeded the respective thresholds; and a life calculation unit 34 that calculates the life of the optical fiber cable 5. As shown in FIGS. 3 and 4, the angle thresholds and the distance thresholds are stored, for the respective positions of the specific points A and B, as regions within which the coordinates of the distal ends of the straight lines LA and LB, which extend from the origin O, can fall, and the angle thresholds and the distance thresholds can be expressed by polar coordinates using the lengths $A_R$ and $B_R$ of the straight lines LA and LB and the angles $A_\theta$ and $B_\theta$ from the coordinate axis.

A determination result from the determination unit 33 is displayed on a display unit (not shown), such as a monitor.

The control device 3 calculates, by using the following expressions, the amounts of damage dealt to the optical fiber cable 5 at the specific points A and B on the basis of the calculated lengths $A_R$ and $B_R$ and the calculated angles $A_\theta$ and $B_\theta$ of the straight lines LA and LB;

$$D1 = Fra(A_R) + F\theta a(A_\theta), \text{ and}$$

$$D2 = Frb(B_R) + F\theta b(B_\theta),$$

where,

D1 indicates the amount of damage at the connection part 41 on the optical fiber cable 5, D2 indicates the amount of damage at the intermediate position of the optical fiber cable 5, $A_R$ indicates the distance from the origin O to the connection part 41 on the optical fiber cable 5, $A_\theta$ indicates the angle of the straight line LA, which is drawn between the connection part 41 on the optical fiber cable 5 and the origin O, with respect to the Z-axis in the YZ-plane, $B_R$ indicates the distance from the origin O to the intermediate position of the optical fiber cable 5, $B_\theta$ indicates the angle of the straight line LB, which is drawn between the intermediate position of the optical fiber cable 5 and the origin O, with respect to the Z-axis in the YZ-plane, Fra and Frb indicate functions for calculating the amounts of damage on the basis of the distances $A_R$ and $B_R$, and F$\theta$a and F$\theta$b indicate functions for calculating the amounts of damage on the basis of the angles $A_\theta$ and $B_\theta$.

The control device 3 calculates, by means of the life calculation unit 34, the remaining life L of the optical fiber cable 5 by using Formula (1) and (2) on the basis of the calculated amounts of damage D1 and D2 and displays the remaining life L on the display unit.

{Formula 1}

$$D = \Sum_{i=0}^{n} D'i \quad (1)$$

{Formula 2}

$$L = H - D \quad (2)$$

where,

L indicates the remaining life,

H indicates the total life,

D indicates the amount of damage dealt to the optical fiber cable during one cycle, $D'_i = D1 + D2$, and n indicates the number of times of sampling during one cycle.

The operation of the thus-configured robot system 1 of this embodiment will be described below.

Figure 5:
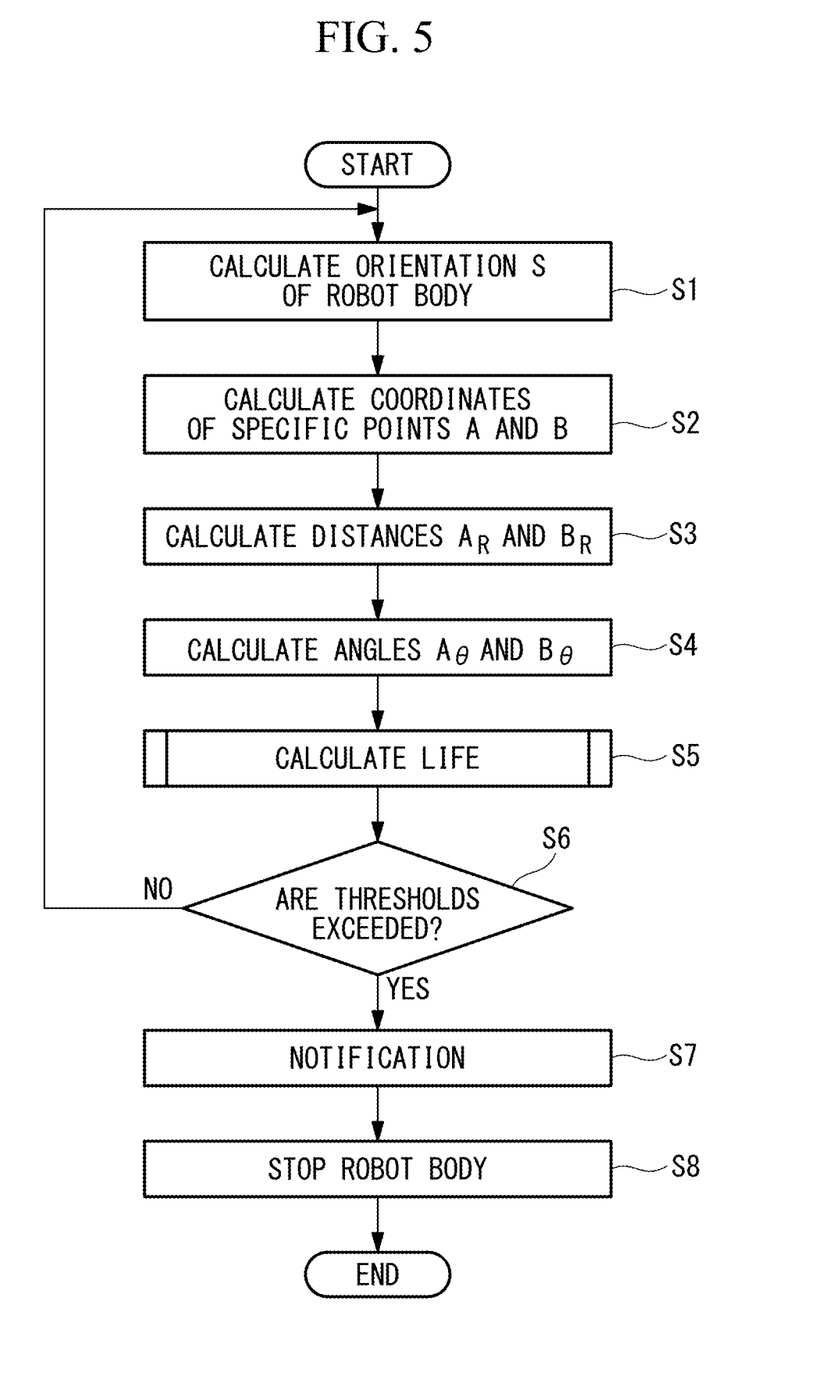
FIG. 5 is a flowchart for explaining the operation of the robot system shown in FIG. 1.
Figure 6:
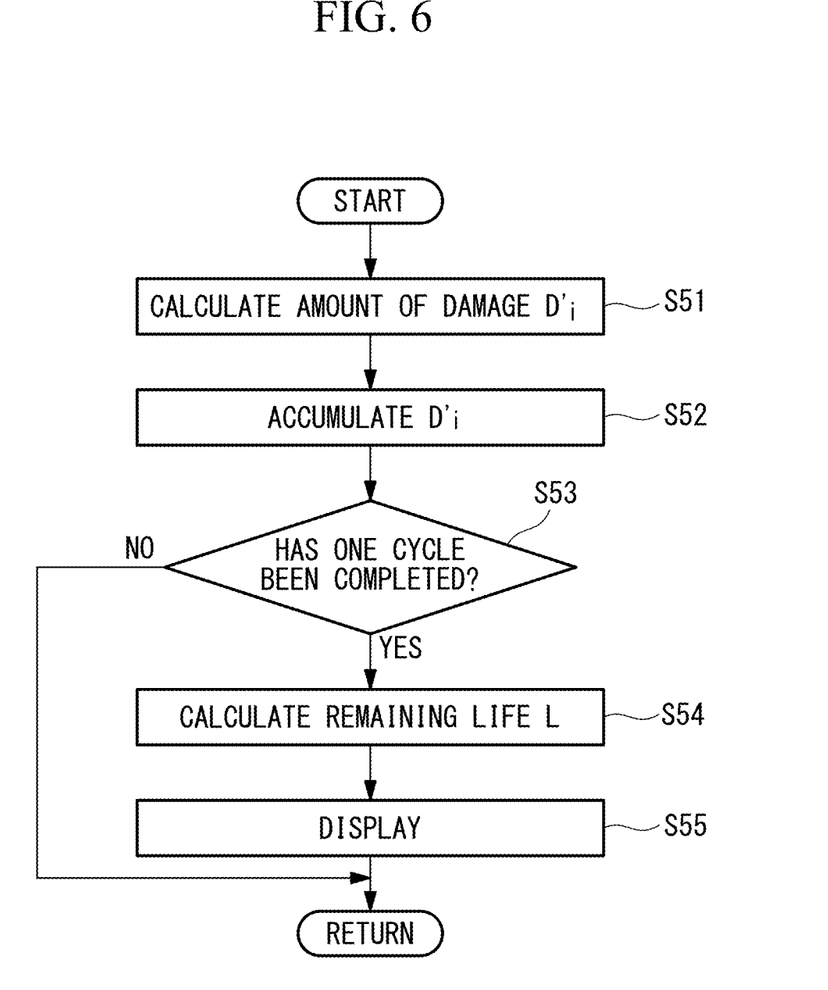
FIG. 6 is a flowchart for explaining a life calculation routine in the flowchart shown in FIG. 5.

According to the robot system 1 of this embodiment, as shown in FIGS. 5 and 6, when the operation of the robot body 2 is started according to a teaching program that is taught in advance, the control device 3 calculates the orientation S of the robot body 2 to be taken T seconds later (Step S1) and calculates the coordinates of the specific points A and B in the outlet coordinate system, in the orientation S (Step S2).

Next, the distances $A_R$ and $B_R$ from the specific points A and B to the origin O of the outlet coordinate system are respectively calculated on the basis of the calculated coordinates (Step S3). The angles $A_\theta$ and $B_\theta$ from the Z-axis in the YZ-plane in the outlet coordinate system are respectively calculated (Step S4).

Next, the life calculation unit 34 performs a life calculation routine (Step S5). In the life calculation routine, the amount of damage $D'_i$ is calculated by using the calculated distances $A_R$ and $B_R$ and the calculated angles $A_\theta$ and $B_\theta$ (Step S51), and the calculated amount of damage $D'_i$ is accumulated (Step S52). Then, it is determined whether one cycle has been completed (Step S53). If one cycle has not been completed, the flowchart returns to the main routine. If one cycle has been completed, the remaining life L is calculated (Step S54) and is displayed on the monitor (Step S55), and the flowchart returns to the main routine.

Next, it is determined whether the calculated distances $A_R$ and $B_R$ and the calculated angles $A_\theta$ and $B_\theta$ have exceeded the respective thresholds (Step S6). If the distances $A_R$ and $B_R$ and the angles $A_\theta$ and $B_\theta$ have not exceeded the respective thresholds, the steps from Step S1 are repeated. On the other hand, if it is determined that the distances $A_R$ and $B_R$ and the angles $A_\theta$ and $B_\theta$ have exceeded the respective thresholds, in Step S6, that determination result is displayed on the display unit (Step S7), and the operation of the robot body 2 is stopped (Step S8).

In this way, according to the robot system 1 of this embodiment, if the angles $A_\theta$ and $B_\theta$ calculated by the angle calculation unit 32 and the distances $A_R$ and $B_R$ have exceeded the respective thresholds, that determination result is displayed on the display unit, thereby issuing a notification; thus, there is an advantage in that, by changing an operation program or changing control on the basis of the determination result, it is possible to allow the 3-axis wrist unit 25 to operate within a region in which no damage is dealt to the optical fiber cable 5, to stabilize the life of the optical fiber cable 5, and to reduce maintenance frequency. Because the angles $A_\theta$ and $B_\theta$ to be obtained T seconds later are predicted, a notification can be issued before damage is dealt to the optical fiber cable 5.

In particular, it is conceivable that the angles $A_\theta$ and $B_\theta$ represent the amounts of twisting of the optical fiber cable 5 at the positions of the specific points A and B, and the optical fiber cable 5 is subject to considerable damage due to twisting, at the connection part 41 on the optical fiber cable 5. Therefore, by determining whether the angles $A_\theta$ and $B_\theta$ have exceeded the angle thresholds and issuing a notification depending on the determination result, it is possible to take measures, e.g., to change the operation to such an operation as not to deal damage to the optical fiber cable 5, thus stabilizing the life of the optical fiber cable 5.

It is conceivable that the distances $A_R$ and $B_R$ represent pulling and compression of the optical fiber cable 5 at the positions of the specific points A and B, and the optical fiber cable 5 is subject to considerable damage due to pulling and compression, at the intermediate position of the optical fiber cable 5. Therefore, by determining whether the distances $A_R$ and $B_R$ have exceeded the distance thresholds and issuing a notification depending on the determination result, it is possible to take measures, e.g., to change the operation to such an operation as not to deal damage to the optical fiber cable 5, thus stabilizing the life of the optical fiber cable 5.

According to this embodiment, because the remaining life L of the optical fiber cable 5 is calculated on the basis of the calculated distances $A_R$ and $B_R$ and angles $A_\theta$ and $B_\theta$ and is displayed on the display unit, there is an advantage in that it is possible to objectively understand, by the displayed remaining life L, damage being dealt to the optical fiber cable 5 and to prompt correction of the operation program, on the basis of the remaining life L.

In this embodiment, although it is determined whether the amount of damage $D'_i$ of the optical fiber cable 5 is large, on the basis of both of the lengths (distances) $A_R$ and $B_R$ of the straight lines LA and LB, which are drawn from the origin O of the outlet coordinate system to the specific points A and B, and the angles $A_\theta$ and $B_\theta$ of the straight lines LA and LB from the Z-coordinate axis, the straight lines LA and LB being projected onto the YZ-plane, instead of this, it is also possible to use only the angles $A_\theta$ and $B_\theta$ in order to determine damage particularly due to twisting or to use only the distances $A_R$ and $B_R$ in order to determine damage particularly due to pulling and compression.

In this embodiment, as a result of the determination made by the determination unit 33, if the distances $A_R$ and $B_R$ or the angles $A_\theta$ and $B_\theta$ have exceeded the thresholds, notification of the determination result is issued; however, instead of this, if the distances $A_R$ and $B_R$ or the angles $A_\theta$ and $B_\theta$ reach the thresholds, the control device 3 may control the wrist elements 26, 27, and 28 of the robot body 2 such that the distances $A_R$ and $B_R$ or the angles $A_\theta$ and $B_\theta$ do not exceed the thresholds.

In this embodiment, although a means for performing screen display by using the display unit is adopted as a notification unit, instead of this, it is also possible to adopt a means for issuing notification of a determination result by sound.

Although the optical fiber cable 5 is shown as an example of the wire body, the wire body is not limited thereto.

In this embodiment, although the amount of damage $D'_i$ is calculated by using the functions Fra and Frb, which calculate the amount of damage $D'_i$ on the basis of the distances $A_R$ and $B_R$, and the functions F$\theta$a and F$\theta$b, which calculate the amount of damage $D'_i$ on the basis of the angles $A_\theta$ and $B_\theta$, instead of this, it is also possible to obtain the amount of damage $D'_i$ by checking a database. Machine learning may also be applied.

As a result, the following aspect is derived from the above described embodiment.

According to one aspect, the present invention provides a robot system including: a robot body; and a control device that controls the robot body, wherein the robot body is provided with a first wrist element that is supported at a distal end of an arm so as to be rotatable about a first axis extending along the longitudinal axis of the arm, a second wrist element that is supported on the first wrist element so as to be rotatable about a second axis intersecting the first axis, and a third wrist element that is supported on the second wrist element so as to be rotatable about a third axis intersecting the second axis; a wire body that is wired through the inside of the arm is connected to an end effector fixed to the third wrist element, by passing through an aerial path outside the robot body, from a wire-body outlet provided in the first wrist element; and the control device is provided with: an angle calculation unit that calculates, in a Cartesian coordinate system of which the origin is the wire-body outlet and which has one coordinate axis extending in a direction along the first axis, an angle of a straight line that connects the wire-body outlet and a specific point of the wire body, with the straight line projected onto a plane perpendicular to the coordinate axis, about the coordinate axis, with reference to a position where a load acting on the wire body is the least; and a determination unit that determines whether the absolute value of the angle calculated by the angle calculation unit has exceeded a predetermined angle threshold.

According to this aspect, the wire body wired through the inside of the arm is connected to the end effector, which is fixed to the third wrist element, by passing through the aerial path outside the robot body, from the wire-body outlet of the first wrist element, which is mounted at the distal end of the arm of the robot body. In this case, when the second wrist element is rotated about the second axis with respect to the first wrist element, or when the third wrist element is rotated about the third axis with respect to the second wrist element, the aerial path changes, thus changing the amount of twisting at the specific point of the wire body according to the size of the rotation angle.

According to this aspect, the angle calculation unit calculates an angle of the straight line, which connects the specific point and the wire-body outlet, with the straight line projected onto a plane perpendicular to the coordinate axis, about the coordinate axis, with reference to a position where the load is the least, and the determination unit determines whether the absolute value of the calculated angle has exceeded the angle threshold. It is conceivable that the calculated angle represents the amount of twisting of the wire body at the position of the specific point, and, if this angle is greater than the angle threshold, a large amount of damage due to twisting is dealt to the wire body. By changing an operation program or changing control on the basis of the determination result, it is possible to allow the wrist to operate within a region in which no damage is dealt to the wire body, to stabilize the life of the wire body, and to reduce maintenance frequency.

In the above-described aspect, the control device may be provided with a distance calculation unit that calculates the distance between the wire-body outlet and the specific point of the wire body; and the determination unit may determine whether the distance calculated by the distance calculation unit has exceeded a predetermined distance threshold corresponding to the angle.

With this configuration, when the second wrist element is rotated about the second axis with respect to the first wrist element, or when the third wrist element is rotated about the third axis with respect to the second wrist element, the aerial path changes, thus changing the amount of pulling or the amount of compression at the specific point of the wire body according to the size of the rotation angle.

The distance calculation unit calculates the distance of the straight line connecting the specific point and the wire-body outlet, and the determination unit determines whether the calculated distance has exceeded the distance threshold corresponding to the angle. It is conceivable that the calculated distance represents the amount of pulling or the amount of compression of the wire body at the position of the specific point, and, if this distance is greater than the distance threshold, considerable damage due to pulling or compression is dealt to the wire body. By changing the operation program or changing control on the basis of the determination result, it is possible to allow the wrist to operate within a region in which no damage is dealt to the wire body, to stabilize the life of the wire body, and to reduce maintenance frequency.

In the above-described aspect, the control device may control the robot body within an angle region in which the angle does not exceed the angle threshold.

With this configuration, it is possible to keep the robot body operating at angles of the respective wrist elements at which damage dealt to the wire body is less, to stabilize the life of the wire body, and to reduce maintenance frequency.

In the above-described aspect, the control device may be provided with a notification unit that issues, when it is determined that the angle has exceeded the angle threshold, a notification indicating the determination result.

With this configuration, it is possible to notify an operator that damage being dealt to the wire body is large and to prompt correction of the operation program.

In the above-described aspect, the control device may control the robot body within a distance region in which the distance does not exceed the distance threshold.

With this configuration, it is possible to keep the robot body operating at angles of the respective wrist elements at which damage dealt to the wire body is less, to stabilize the life of the wire body, and to reduce maintenance frequency.

In the above-described aspect, the control device may be provided with a notification unit that issues, when it is determined that the distance has exceeded the distance threshold, a notification indicating the determination result.

With this configuration, it is possible to notify the operator that damage being dealt to the wire body is large and to prompt correction of the operation program.

In the above-described aspect, the control device may store the angles successively calculated by the angle calculation unit and may calculate the life of the wire body on the basis of the stored time-series angles.

With this configuration, with the calculated life, it is possible to make the damage being dealt to the wire body more specific, and to prompt correction of the operation program on the basis of the life.

The invention claimed is:

1. A robot system comprising:
a robot body; and
a control device that controls the robot body,
wherein the robot body is provided with a first wrist element that is supported at a distal end of an arm so as to be rotatable about a first axis extending along the longitudinal axis of the arm, a second wrist element that is supported on the first wrist element so as to be rotatable about a second axis intersecting the first axis, and a third wrist element that is supported on the second wrist element so as to be rotatable about a third axis intersecting the second axis;
a wire body that is wired through the inside of the arm is connected to an end effector fixed to the third wrist element, via passing through an aerial path outside the robot body, from a wire-body outlet provided in the first wrist element; and
the control device is provided with: an angle calculation unit that calculates, in a Cartesian coordinate system of which the origin is the wire-body outlet and which has one coordinate axis extending in a direction along the first axis, an angle of a straight line that connects the wire-body outlet and a specific point of the wire body, with the straight line projected onto a plane perpendicular to the coordinate axis, about the coordinate axis, with reference to a position where a load acting on the wire body is the least; and a determination unit that determines whether the absolute value of the angle calculated by the angle calculation unit has exceeded a predetermined angle threshold.

2. A robot system according to claim 1, wherein the control device is provided with a distance calculation unit that calculates the distance between the wire-body outlet and the specific point of the wire body; and the determination unit determines whether the distance calculated by the distance calculation unit has exceeded a predetermined distance threshold corresponding to the angle.

3. A robot system according to claim 1, wherein the control device controls the robot body within an angle region in which the angle does not exceed the angle threshold.

4. A robot system according to claim 1, wherein the control device is provided with a notification unit that issues, when it is determined that the angle has exceeded the angle threshold, a notification indicating the determination result.

5. A robot system according to claim 2, wherein the control device controls the robot body within a distance region in which the distance does not exceed the distance threshold.

6. A robot system according to claim 2, wherein the control device is provided with a notification unit that issues, when it is determined that the distance has exceeded the distance threshold, a notification indicating the determination result.

7. A robot system according to claim 1, wherein the control device stores the angles successively calculated by the angle calculation unit and calculates the life of the wire body on the basis of the stored time-series angles.

* * * * *